United States Patent Office 3,232,871
Patented Feb. 1, 1966

3,232,871
DRILLING FLUID
Clarence O. Walker, Houston, and Walter J. Weiss, Sugar Land, Tex., assignors to Texaco Inc., New York, N.Y., a corporation of Delaware
No Drawing. Filed Jan. 21, 1965, Ser. No. 427,138
12 Claims. (Cl. 252—8.5)

This application is a continuation-in-part of application Serial No. 97,151, filed March 21, 1961, now abandoned.

This invention relates to a novel aqueous drilling fluid for drilling wells through sub-surface formations by means of well drilling tools, and particularly to such an aqueous well drilling fluid having both improved dispersibiity and improved high temperature stability as a result of containing therein a novel starch dispersant. The invention is also concerned with a method of drilling wells employing the novel aqueous drilling fluid, a novel process for producing the starch dispersant, and the starch dispersant per se as a composition of matter.

Drilling fluids, or muds as they are sometimes called, are slurries of clayey solids used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. On a high temperature basis a shear below 500 pounds per 100 square feet is advantageous. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above. This problem is of particular importance when drilling extremely deep wells, which may range from 12,000 to 20,000 feet or more in depth in modern drilling technology. At such depths the temperature rises to a high value and may at times be as high as 300-450° F. Under such high temperature conditions ordinary muds tend to lose their stability, to thicken in the hole, and generally exhibit a shear value in excess of 500 pounds per 100 square feet thus hampering the drilling operation seriously.

In accordance with the present invention the problems of dispersibility and high temperature stability in aqueous drilling fluids can be solved by incorporating in an aqueous drilling fluid a non-catalytic heat modified starch material which has been produced by subjecting a starchy material to a dextrinization temperature between about 300° and 400° F. for a period of time of at least about 36 hours. Advantageously, the temperature of dextrinization is about 350° F. for the most satisfactory results; and a period of heating should be used of approximately one week (168 hours). Below about 300° F. the desired dispersibility and stability properties are not obtained, within a reasonable length of time, while at temperatures above about 400° F. extreme care is necessary to prevent charring of the dextrin. At the temperature range 300–400° F. the desired improved dispersing and stabilizing properties are not obtained in aqueous drilling fluids at heating times less than about 36 hours. A heating time of 3 weeks (504 hours) does not improve the results obtained commensurate with the additional costs.

The non-catalytic heat-modified starch dispersant is employed in the aqueous drilling fluid in an amount sufficient to provide improved dispersibility and high temperature stability thereto. Generally, amounts in the range 0.5 to 15 pounds of dispersant are satisfactory, although best results are obtained at 3–5 pounds per barrel of fluid.

Uniform heating of the starch can be accomplished in a shallow dish placed in an oven, with or without the access of air. Another way to heat the starch is in a rotating steel drum in an oven. The starch also can be heated in a bed while blowing through it a gas such as air, or nitrogen containing but little oxygen (e.g., 0.3%). Predrying to remove the 10% of water normally present is not essential.

If desired, the novel product can be prepared by starting with premodified starches rather than simple starch. A representative type of premodified starch is yellow dextrin, a standard article of commerce prepared by the short time low temperature heating of starch. Consequently, the term "starchy material" used herein is intended to embrace both starch and premodified starch such as yellow dextrin and pregelatinized starch, such as the drilling mud filtration grade material sold under such trade names as My-lo-gel.

A modified starch dispersant produced by the process steps described above is characterized by a color which ranges from brown to red and by a relatively low water solubility compared with ordinary dextrin, solubility in boiling water being as little as 10% or less by weight (90% or more insoluble solids) compared to 100% for yellow dextrin. However it is fully soluble in aqueous caustic solutions.

Surprisingly, as the heating time of the starchy material increases, i.e., in the range of 18–24 hours the effect of the resultant product on the water loss properties of aqueous drilling fluids at first improves; but with the longer heating times, i.e., of 36 hours or more, water-loss property decreases while the dispersion effectiveness and high temperature stability improve.

Many of the experimental determinations described hereinafter were conducted for convenience upon calcium base shale control drilling muds of the type described in detail in U.S. Patent 2,802,783. Such a mud comprises clayey solids suspended in an alkaline aqueous phase which consists essentially of a saturated aqueous calcium hydroxide solution and a water soluble calcium salt which has a solubility in the aqueous phase greater than that of calcium hydroxide dissolved therein, to yield a calcium ion concentration in the aqueous phase of at least 200 p.p.m. by weight, and sufficient to stabilize and control the mud making properties of heaving shale material in contact with the mud. However, the principles of the invention are applicable to other types of muds.

A general discussion of high temperature phenomena follows, with particular reference to the significance of shear or gel strength measurements, and the viscosity of samples.

In general, some degree of high temperature gelation occurs in most clay-water systems when exposed to temperatures above normal. High temperatures affect muds in two distinct manners. Under static conditions temperature accelerates the development of gel structure in the mud. The end result of this gel development will depend upon the temperature, time for development, and susceptibility of the mud to gelation. The strength of the gel developed will range from a low, easily measured gel, through plasticity to a rigid cement-like mass which practically defies classification as a gel.

A second high temperature reaction is the effect on viscosity. As with the gel development, temperature may have little or no effect on the viscosity of the mud or may thicken the mud to a point where it becomes practically unpumpable. The end viscosity of a mud appears to be independent of whether the mud has been continually agitated or remained quiescent during the heating cycle. The effect of temperature on the physical properties of muds may be classified into three characteristic patterns.

*Normal response to temperature*

Drilling mud slurries possess a property known as thixotropy. Therefore the clay particles of the slurry tend to orient themselves with time under a static condition to produce a semi-rigid gel structure. Elevated temperatures tend to accelerate the rate of formation and degree of development of this property to such an extent that muds often develop gel structures of appreciable strength.

Muds possessing a normal response to temperature will refluidize to a condition approximating their original viscosity when subjected to mechanical agitation.

*Abnormal response to temperature*

In a second response to temperature, which is called high temperature gelation, the muds undergo gelation to yield similar semi-rigid structures; but these gels are not thixotropic. Therefore, the muds will not refluidize satisfactorily but remain as highly viscous to semi-plastic slurries.

The degree of gelation cannot of itself be used to distinguish muds of this type for, although the degree of gelation in muds of this type is usually somewhat higher than in muds possessing normal temperature response, there can be appreciable overlap between the two types. The important criterion is the retention or loss of thixotropic response following high temperature aging.

*High temperature solidification*

The most severe reaction to temperature is often referred to as high temperature solidification. In this case a more complex rigid structure is formed which in severe cases approaches a cement-like solid consistency. These muds usually have lost any resemblance to a thixotropic fluid and upon agitation may tend to granulate and crumble into a discontinuous mass.

In the tables fluidity of a mud is reported as viscosity, determined in centipoises (cps.) by a rotary viscosimeter, all results being comparable. Gel strength is reported as determined by a shearometer (API Code 29), results being expressed either as pounds/100 square feet, or as time in seconds for a tube to settle in the mud (after the mud has stood for zero time and for 10 minutes). If the tube settles in less than 60 seconds, the shear is reported at $0^t$ where $t$ is time in seconds. If it settles in more than 60 seconds, shear is reported as pounds/100 square feet.

In the following Table I, incorporating Examples 1 to 6, commercially available yellow dextrins, previously converted by heating corn starch and sold by the National Starch Co. under the trade names Nadex 791 (Examples 3–5) and 771 (Example 6), were non-catalytically heated at the temperatures and for the times indicated. The resulting modified starch dextrins were incorporated as dispersants in a Caillou Island top hole drilling mud containing 15% by volume of low gravity clay solids, 3.2 lbs./bbl. dextrin, 3.2 lbs./bbl. lime, 0.6 lb./bbl. calcium chloride, balance water. Comparative tests were also made on a similar drilling fluid containing unmodified yellow dextrin (Nadex 791—Example 2) as thinner, and on a similar mud containing calcium lignosulfonate (a commercial dispersant known as Kembreak—Example 1).

TABLE I

| Ex. | Thinner, hrs./temp. °F. | Vis. (cps.) at 600 r.p.m. | Gel strength, lbs./100 ft.² (after mud heated 8 hrs. at 300° F. without agitation) |
| --- | --- | --- | --- |
| 1 | Kembreak | 34.9 | 650 |
| 2 | Nadex 791 | 67.0 | 840 |
| 3 | 96/300 | 53.7 | 500 |
| 4 | 168/300 | 31.0 | 260 |
| 5 | 48/330 | 35.5 | 475 |
| 6 | 168/330 | 43.2 | 240 |

In the following Table II, incorporating Examples 7–19, commercially available Argo brand corn starch was non-catalytically heated in a dry state and the resulting products (Examples 10–19) were incorporated as dispersants in the amount of 3 pounds per barrel (4.5 in Example 15) in a Caillou Island top hole drilling mud containing 13% by volume of low gravity clay solids, 3 lbs./bbl. of lime, 0.6 lbs./bbl. of calcium chloride, 3 lbs./bbl. of thinner (4.5 in Example 15) balance water. Comparative tests were also run on the same mud containing unheated corn starch (Example 8), and on the same mud containing Kembreak (Example 9).

TABLE II

| Ex. | Thinner, hrs./temp. °F. | Vis. (cps.) at 600 r.p.m. | Gel strength, lbs./100 ft.² (after mud heated at 300° F. 24 hours without agitation) |
| --- | --- | --- | --- |
| 7 | None | 64.9 | 725 |
| 8 | Starch | (*) | 3,800 |
| 9 | Kembreak | 40.7 | 1,960 |
| | Dextrin | | |
| 10 | 72/300 | 141 | 480 |
| 11 | 168/300 | 71.2 | 475 |
| 12 | 336/300 | 79.7 | 485 |
| 13 | 504/300 | 44.5 | 315 |
| 14 | 672/300 | 38.5 | 240 |
| 15 | 672/300 | 51.1 | 210 |
| 16 | 72/350 | 66.6 | 570 |
| 17 | 168/350 | 28 | 155 |
| 18 | 336/350 | 14.4 | <80 |
| 19 | 504/350 | 33.5 | 220 |

*Too viscous.

In the following Table III, the effect of concentration of the novel dispersants in the same mud of Table II is shown for starch products obtained by non-catalytically heating starch at 350° F. for 168 hours (Examples 20–23) and for 336 hours (Examples 24–27).

TABLE III

[Starch heated at 350° F.]

| Ex. | Conc., lbs./bbl. | Vis. (cps.) at 600 r.p.m. before heating | After mud heated at 300° F. | |
|---|---|---|---|---|
| | | | 24 hrs. without agitation gel strength, lbs. per 100 ft.[2] | 8 hrs. with agitation viscosity at 600 r.p.m. |
| 168 hrs.: | | | | |
| 20 | 2.25 | 29.6 | 135 | 60.9 |
| 21 | 3 | 28.0 | 155 | 67.0 |
| 22 | 3.75 | 35.3 | 140 | 63.1 |
| 23 | 4.5 | 39.6 | 135 | 46.0 |
| 336 hrs.: | | | | |
| 24 | 2.25 | 19.4 | <80 | 47.4 |
| 25 | 3 | 14.4 | <80 | 46 |
| 26 | 3.75 | 14.4 | 95 | 63.3 |
| 27 | 4.5 | 13.8 | 95 | 72.2 |

In the following Table IV, the results of tests in the same type of drilling muds as employed in Tables I to III are shown. The drilling fluids containing starch materials heated for 4, 8 and 23 hours (Examples 32–34) were ineffective dispersants at room temperature whereas drilling fluids containing starch materials heated for 69 and 168 hours were excellent dispersants at room temperature. In addition, these latter materials (Examples 28–31) exhibited good to excellent high temperature stability.

TABLE IV

| Example | Thinner, hours/temperature ° F. | Effect on Mud | |
|---|---|---|---|
| | | Room Temperature | Elevated Temperature |
| 28 | 69/350 | Dispersed well | Intermediate stability. |
| 29 | 69/350 | do | Do. |
| 30 | 168/350 | do | Excellent stability. |
| 31 | 168/350 | do | Do. |
| 32 | 8/400 | Ineffective | |
| 33 | 4/424 | do | |
| 34 | 23/412 | do | |

In the following Table V, the effects of a starch dispersant (2 lbs./bbl.) prepared by non-catalytically heating corn starch for 350° F. for various times, and used in a Caillou Island spud mud containing 15% by volume of low gravity solids is shown. The stock fluid was pretreated with 1 lb./bbl. sodium hydroxide and aged 6 hours at 140° F. prior to adding the starch dispersant to offset acidity of the dextrin.

TABLE V

| Heating Time, hrs. | Viscosity (cps.) | | pH | Water Loss* |
|---|---|---|---|---|
| | 600 r.p.m. | 100 r.p.m. | | |
| Base Mud | 32.2 | 82.4 | 12.0 | 15.2 |
| 2 | 35.6 | 94.2 | 12.0 | 12.4 |
| 4.8 | 41.1 | 100.1 | 12.0 | 8.0 |
| 6.3 | 40.5 | 96.5 | 11.95 | 8.8 |
| 8.2 | 39.5 | 91.8 | 12.0 | 9.0 |
| 18 | 39.1 | 94.8 | 11.86 | 11.0 |
| 24 | 37.4 | 80.1 | 11.88 | 11.0 |
| 252 | 23.2 | 29.5 | 10.8 | 12.8 |
| 336 | 16.7 | 16.6 | 10.5 | 12.8 |
| 420 | 16.0 | 16.6 | 10.22 | 13.0 |
| 504 | 14.7 | 14.3 | 10.3 | 12.8 |
| 588 | 14.1 | 14.3 | 10.2 | 12.8 |

*API water loss test—ml. water lost in 30 minutes at 100 p.s.i. test pressure.

From Table V it can be seen that control of the water loss properties of the mud is realized to some extent with increased starch heating time up to about 24 hrs. but beyond 24 hours this water loss control property diminishes. However, a significant reduction in viscosity occurred beyond 24 hours heating time, indicating the improved dispersing ability. Excellent dispersing properties, albeit with reduced fluid loss control, are realized with those starches prepared by heating starch 252 to 588 hours.

Table V presents a definite distinction between commercial starch dextrin and the novel starch product of the present invention. In the table the first four samples representing a commercial starch heated up to 8.2 hours, show the typical starch properties in a drilling fluid; that is, the material increases viscosity while effectively reducing fluid loss. The material is also characteristic of a commercial starch in that it exhibits little or no acidic properties as shown by the unchanged pH of the drilling fluid. In contrast, the starch product of the present invention heated over 36 hours radically reduces the viscosity of the drilling fluid while not exhibiting desirable filtration control properties. It possesses, furthermore, a definitely well developed acidic nature since the pH of the similarly treated mud has been radically reduced.

The 18 and 24 hour samples in Table V are somewhat transitional in character. However, they should be classified as unsatisfactory materials as they do not exhibit dispersing properties in drilling fluids (they increase the viscosity of the base mud).

The following tables compare the novel starch dispersant of the present invention with other dispersants in general use in drilling fluids. In all cases the mud was treated with caustic soda to offset the acidic effect of the dispersing agent and adjust the pH to comparable values.

In Table VI the superior dispersing power of a starch product prepared by heating food grade corn starch at 350° for 168 hours, compared to a natural tannin material (quebracho), is shown in a Caillou Island top hole mud containing 15% by volume of low gravity solids. All muds were adjusted to a low pH between 9 and 9.5.

TABLE VI

| Thinner | Conc., lbs./bbl. | Viscosity (cps.) at 600 r.p.m. | Gel Strength | |
|---|---|---|---|---|
| | | | 0[1] | 10[1] |
| Quebracho | 1 | 56.3 | 0[1] | 0[36] |
| Dextrin | 1 | 34.0 | 0[1] | 0[12] |
| Quebracho | 1.5 | 45.5 | 0[1] | 5.7 |
| Dextrin | 1.5 | 36.0 | 0.8 | 0[40] |
| Quebracho | 2 | 44.5 | 0[2] | 6 |
| Dextrin | 2 | 41.8 | 0[1] | 0[45] |

In Table VII the superior dispersing power of a starch product prepared by heating laundry grade corn starch at 350° F. for various times, is shown in a Caillou Island top hole mud converted to a high pH-low lime mud system. The mud contained 3 lbs./bbl. of lime as calcium hydroxide and at least 1 lb./bbl. sodium hydroxide to yield the desired alkalinity. For comparison purposes, a ferro-chrome lignosulfonate dispersant sold under the trade name "Q-Broxin" was also tested in the same mud. The mud pH in every case was 12.6 or 12.7; and 4 pounds of dispersant per barrel of mud was used.

TABLE VII

| Dispersant | Heating Time, hrs. | Viscosity (cps.) at— | | Gel Strength | |
|---|---|---|---|---|---|
| | | 600 r.p.m. | 100 r.p.m. | 0[1] | 10[1] |
| Q-Broxin | | 53.5 | 90.6 | 0.8 | 4.4 |
| Roasted Starch Product | 168 | 30.6 | 66 | 0.5 | 3.9 |
| Q-Broxin | | 73.1 | 130.5 | 0[3.2] | 9.5 |
| Roasted Starch Product | 590 | 20 | 26 | 0.5 | 0[1.5] |

In Table VII the dispersing power in a gyp mud of the heated starch product prepared by heating food grade corn starch for 1 week at 350° F. is shown in a Caillou Island top hole spud mud containing 15% by volume of low gravity solids, and treated with 5 lbs./bbl. of gypsum, 3 and 5 lbs./bbl. of the novel starch dispersant, and sufficient sodium hydroxide to adjust the alkalinity of the mud to a pH of about 10, and then compared with a commercially available ferro-chrome lignosulfonate (Q-Broxin) presently used in such systems as a dispersant.

TABLE VIII

| Thinner | Conc., lbs./bbl. | Vis. (cps.) at 600 r.p.m. | Gel Strength | | Water Loss API |
|---|---|---|---|---|---|
| | | | $0^1$ | $10^1$ | |
| Starch Product | 3 | 36 | 17 | 22 | 7.8 |
| Do | 5 | 30.5 | $0^3$ | 4.3 | 4.1 |
| Q-Broxin | 3 | 44.0 | 5.5 | 18.0 | 6.0 |
| Do | 5 | 39.3 | $0^{6.5}$ | 8.0 | 6.4 |

The novel starch product of the invention can also be used successfully in drilling muds containing additives other than those mentioned previously herein. For example, it can be used in a mud containing chromate salts such as sodium chromate which has previously been added to protect the mud against temperature degradation.

Furthermore, the novel starch product can be prepared from starches other than corn starch, e.g., starch from arrow root, tapioca, sago, and potato.

We claim:

1. An aqueous well drilling fluid containing at least about 0.5 pound per barrel of fluid of a modified starch dextrin produced by subjecting a starchy material to a temperature between 300 and 400° F. for a period of time of at least 36 hours to provide improved dispersibility and improved high temperature stability to said well drilling fluid.

2. An aqueous well drilling fluid in accordance with claim 1 wherein said temperature is about 350° F.

3. An aqueous well drilling fluid in accordance with claim 1 wherein said modified starch dextrin is present in an amount between 0.5 and 5 pounds per barrel of fluid.

4. An aqueous well drilling fluid in accordance with claim 1 also comprising an alkaline aqueous phase which consists essentially of a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud making properties of heaving shale material in contact with the drilling fluid, said aqueous phase having a pH not greater than about 12.6.

5. In the art of drilling wells wherein a drilling fluid is passed through the well in contact with earth formations during the drilling operation, the improvement which comprises contacting said earth formations with an aqueous drilling fluid containing at least about 0.5 pound per barrel of drilling fluid of a modified starch dextrin produced by subjecting a starchy material to a temperature between 300 and 400° F. for a period of time of at least 36 hours to provide improved high temperature stability and improved dispersibility to said aqueous drilling fluid.

6. In the art of drilling wells in accordance with claim 5 said drilling fluid also comprising an alkaline aqueous phase which consists essentially of a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud making properties of heaving shale material in contact with the drilling fluid, said aqueous phase having a pH not greater than about 12.6.

7. A process for producing a modified starch dextrin product characterized by its ability to improve the high temperature stability and the dispersibility of an aqueous well drilling fluid, said process comprising subjecting a starchy material to a temperature between 300 and 400° F. for a period of time of at least 36 hours.

8. A process in accordance with claim 7 wherein said temperature is about 350° F.

9. A modified starch dextrin product characterized by the ability to provide improved high temperature stability and improved dispersibility to an aqueous well drilling fluid, said product comprising the product of subjecting a starchy material to a temperature between 300 and 400° F. for a period of time of at least 36 hours.

10. A modified starch dextrin product in accordance with claim 9 wherein said temperature is about 350° F.

11. A heat modified starch dextrin product suitable for use in an aqueous drilling fluid to improve the dispersibility and high temperature stability thereof when employed in an amount between 0.5 and 15 pounds of starch per barrel of drilling fluid, said product being obtained by heating starch at a temperature between 300 and 400° F. for a period of time of at least 36 hours.

12. An aqueous well drilling fluid containing between about 3 and 5 pounds per barrel fluid of a modified starch dextrin produced by subjecting a starchy material to a temperature between 300 and 400° F. for a period of time of at least 36 hours to produce a product which will provide improved dispersibility and improved high temperature stability to said well drilling fluid.

References Cited by the Examiner

UNITED STATES PATENTS

| | | | |
|---|---|---|---|
| 2,156,488 | 5/1939 | Bode | 127—32 |
| 2,604,447 | 7/1952 | Cummer et al. | 252—8.5 |
| 2,660,561 | 11/1953 | Watkins | 252—8.5 |
| 2,802,783 | 8/1957 | Weiss et al. | 252—8.5 |

OTHER REFERENCES

Kerr, Chemistry and Industry of Starch, Second Ed., published 1950 by Academic Press Inc., New York, New York, pages 357, 360, 364, and 365.

JULIUS GREENWALD, *Primary Examiner.*

UNITED STATES PATENT OFFICE
CERTIFICATE OF CORRECTION

Patent No. 3,232,871  February 1, 1966

Clarence O. Walker et al.

It is hereby certified that error appears in the above numbered patent requiring correction and that the said Letters Patent should read as corrected below.

Column 6, line 71, for "Table VII" read -- Table VIII --.

Signed and sealed this 20th day of December 1966.

(SEAL)
Attest:

ERNEST W. SWIDER
Attesting Officer

EDWARD J. BRENNER
Commissioner of Patents